May 10, 1938.  R. F. PEO  2,116,981
AIR CONDITIONING EVAPORATOR UNIT
Filed Oct. 10, 1935
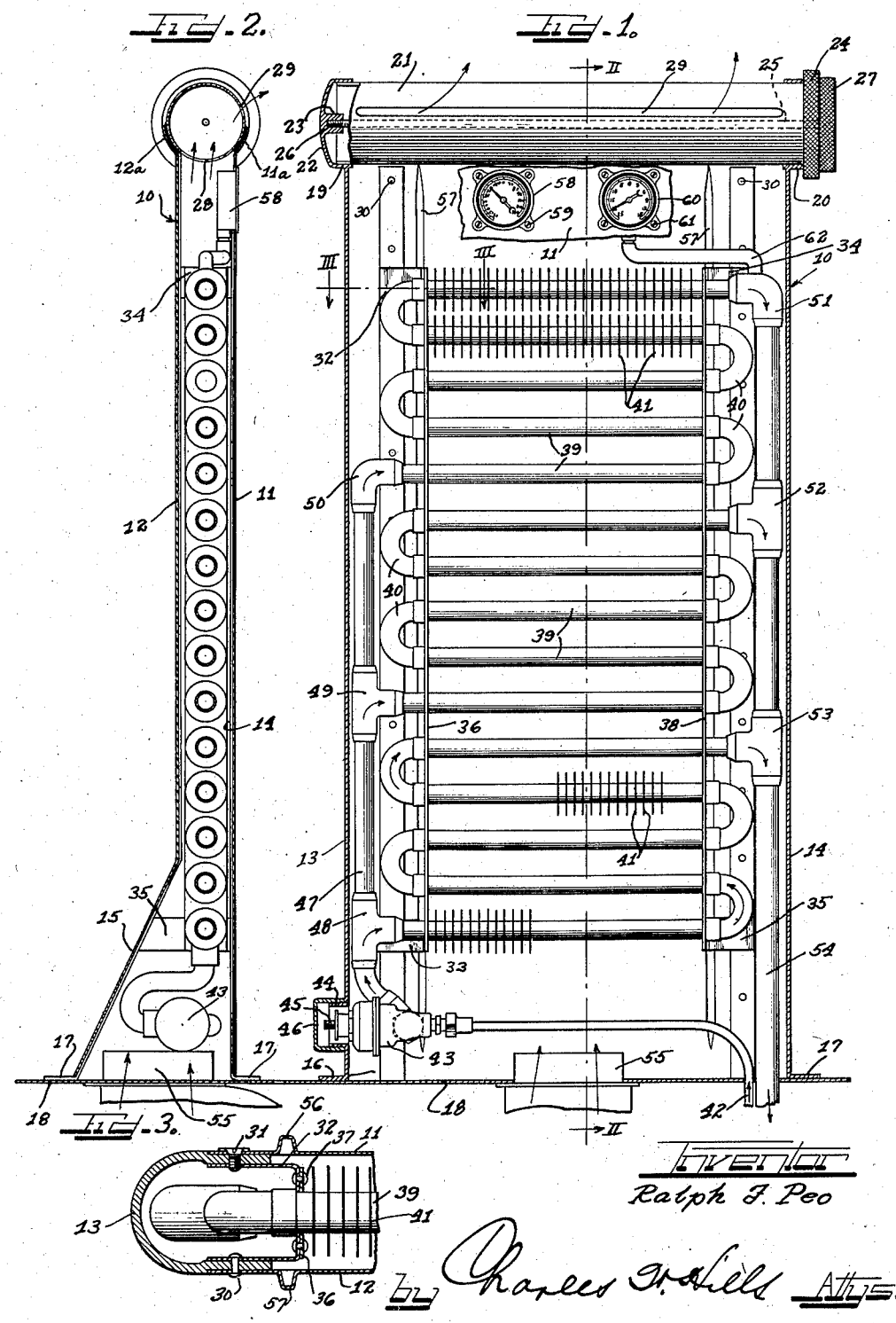

Patented May 10, 1938

2,116,981

UNITED STATES PATENT OFFICE 2,116,981

AIR CONDITIONING EVAPORATOR UNIT

Ralph F. Peo, Buffalo, N. Y., assignor to Houde Engineering Corporation, Buffalo, N. Y., a corporation of New York Application October 10, 1935, Serial No. 44,359

5 Claims. (Cl. 257—230)

This invention relates to an evaporator unit for conditioning air which is adapted to be mounted within an enclosed space such as a room or an automobile body.

More specifically this invention relates to an evaporator unit for conditioning air in closed automobile bodies which is adapted to be mounted vertically behind the seat of an automobile such as, for example, behind the rear seat of a sedan body and deliver conditioned air for circulation throughout the entire interior of said body.

In the conditioning of automotive vehicles it is desirable to provide a compact evaporator unit having extended cooling surfaces to contact the air to be conditioned and absorb heat therefrom. In the device of this invention an elongated container is provided for receiving cooling coils therein. The container is preferably of a rectangular shape and of relatively small width so that it may be vertically mounted in an automobile body without utilizing much space. Since the container is mounted within the automobile body it need not be insulated because any heat absorption directly affects the air within the automobile vehicle. The container may be conveniently mounted on the floor of the vehicle behind the rear seat thereof or behind the seat of a coupe type body and extends above the seat to deliver conditioned air through a delivery slot which can be manually adjusted to direct the stream of air at any desired angle. The refrigerant delivery tube extends into the bottom of the container and an expansion valve for the refrigerant is also preferably mounted within the container so that any heat absorption effected by the expansion of the refrigerant in the valve is directly utilized to cool the interior of the vehicle.

It is therefore an object of this invention to provide an evaporator unit for conditioning air which is adapted to be mounted within the space to be conditioned.

Another object of this invention is to provide an evaporator unit for conditioning air adapted to be mounted in closed automobile bodies without occupying much space.

A further object of this invention is to provide a heat transfer device for cooling air which is adapted to deliver a stream of cool air at any desired angle.

A further object of this invention is to provide an air conditioning evaporator unit for mounting within closed automobile bodies which efficiently absorbs heat from air circulated therethrough for cooling the interior of said bodies.

Other and further objects of this invention will be apparent from the disclosures in the specification and the accompanying drawing.

This invention (in a preferred form) is illustrated in the drawing and hereinafter more fully described.

On the drawing:

Figure 1 is a front elevational view of the evaporator unit of this invention with parts of the front plate broken away.

Figure 2 is a cross-sectional view taken substantially along the line II—II of Figure 1.

Figure 3 is an enlarged cross-sectional view, with parts in elevation, taken substantially along the line III—III of Figure 1.

As shown on the drawing

The reference numeral 10 indicates generally the evaporator unit comprising a container formed from a front plate 11, a back plate 12 and U-shaped strips or castings 13 and 14 forming the sides of the unit on which the plates 11 and 12 are secured. The tops of the plates 11 and 12 are arcuately curved outwardly as at 11a and 12a (Figure 2) for a purpose hereinafter described. The bottom portion of the plate 12 slopes outward as indicated at 15, and the castings 13 and 14 are also widened at this portion to extend across between the plates. The castings 13 and 14 are provided with outturned flanges 16 and 17 at the bottoms thereof. These flanges may be secured flush to the floor 18 of an automotive vehicle or of the room to be conditioned and thus mount the unit in position. The container therefore does not require a bottom plate.

The tops of the castings 13 and 14 have annular bosses 19 and 20 respectively formed integrally thereon for receiving the ends of a tube 21 which nests in the curved portions 11a and 12a of the plates 11 and 12. Packing strips or spring metal strips may be inserted between the tube 21 and the curved portions 11a and 12a to prevent leakage of air from the container and yet allow the tube to be rotated thereover.

As shown in Figure 1, the boss 19 is closed as at 22 and is provided with a threaded lug 23 extending inwardly from the center thereof. The boss 20 on the casting 14 is open and receives the tube 21 therethrough. The tube 21 has secured thereon a knurled collar 24 abutting the boss 20. A rod or bolt 25 extends through the tube 21 and is threaded into the lug 23 of the boss 19 as shown at 26. The bolt 25 has secured at its other end thereof a knurled knob 27 abutting the collar 26. The tube 21 is provided with a relatively wide slot 28 (Figure 2) adapted to register with the interior of the container as shown in Figure 2. A narrower slot 29 is cut across the tube 21 to provide an opening for the delivery of conditioned air to the space to be cooled.

By means of this construction, the tube 21 can be rotated relative to the container by loosening the bolt 25 so that the end 27 thereof permits manually turning of the collar 26 to rotate the tube. The slot 29 can thus be moved so that air issuing therefrom will be directed at any desired angle. The tube is locked into position by threading the bolt 25 into the lug 23 and thereby clamping the knob 27 against the collar 26.

As shown in Figures 1 and 3, the side castings 13 and 14 provide the supporting means for the container. The back plate 12 is riveted to the castings 13 and 14 as shown at 30. The front plate 11 is bolted to the castings 13 and 14, as shown at 31 in Figure 3. This plate may thereby readily be removed for inspection of the interior of the container.

The casting 13 carries U-shaped brackets 32 and 33 as shown in Figure 1. As shown in Figure 3, these brackets are secured to the casting 13 by the rivets 30 and bolts 31 which hold the plates 11 and 12 thereon. The casting 14 is likewise provided with similar U-shaped brackets 34 and 35 as shown in Figure 1.

The brackets 32 and 33 have an apertured metal strip 36 secured thereon by means of rivets 37 on the base of the brackets. Likewise the brackets 34 and 35 have an apertured metal strip 38 riveted thereon. The strips 36 and 38 extend along the container in spaced parallel relation from the sides 13 and 14 thereof and receive the ends of a plurality of cooling pipes or tubes 39 therethrough at right angles thereto. Elbows 40 are secured on the ends of the tubes 39 as shown in Figure 1 and abut the strips 36 and 38, thereby holding the tubes in secure relation to the strips. The tubes 39 are preferably provided with radiating fins 41 either formed integrally thereon or secured therearound. These fins effect a better heat transfer between air passing through the container and the refrigerant passing through the tubes 39.

A tube 42 for delivering compressed refrigerant from a suitable source enters into the container at the bottom thereof and delivers the refrigerant to an expansion valve 43 located in the widened portion at the bottom of the container. As shown in Figure 1, the casting 13 has formed thereon a boss 44 through which an adjusting means 45 for the expansion valve 43 may extend. A cap 46 is threaded on the boss 44 for closing the aperture after the proper adjustment of the expansion valve has been made.

Expanded refrigerant from the valve 43 is directed into a header pipe 47 in communication with the cooling tubes 39 at 48, 49 and 50. Refrigerant from the header pipe 47 passes through the cooling tubes 39 in a sinuous or serpentine path and is discharged at 51, 52 and 53 into a return header pipe 54 leading to the compressor (not shown). While the tubes 39 have been shown to be mounted in three units communicating at three points with the inlet and discharge header pipes 47 and 54. It is obvious that any other form of circulation arrangement may be used.

Air from a blower (not shown) enters through a duct 55 extending through the floor 18 into the container and blows upward therethrough over the cooling tubes 39. The large cooling surfaces of the pipes 39 quickly effects a cooling of the air so that when the same is delivered through the slots 28 and 29 it is properly conditioned for entry into the vehicle or room to be cooled.

The plates 11 and 12 may be stamped near their edges to provide beads 56 and 57 thereon to impart rigidity to the plates and permit the same to be made of a very light gauge metal.

The front plate 11 is apertured near the top thereof for receiving a bi-metallic thermometer 58 therethrough. The thermometer 58 is bolted to the plate 11 as shown at 59.

A gauge 60 may also be secured in the front plate 11 by means of bolts 61. This gauge communicates with the discharge header 54 through a pipe 62 and indicates the vacuum or pressure within the discharge header. It should be understood that the gauge and thermometer may be mounted on the dashboard of an automotive vehicle and connected with the evaporator unit in any suitable manner to register the temperature of the air issuing therefrom and the pressure of the expanded refrigerant.

From the above description it is evident that the evaporator unit of this invention provides a compact heat transfer medium for cooling air or other gases and is readily adapted to be mounted inside of an automobile vehicle or inside of a room without utilizing much space. The conditioned air issuing from the evaporator unit can be directed into the room at any desired angle and the outlet for the conditioned air may be partially closed if desired by merely rotating the tube to position the slots behind the arcuate portions 11a and 12a of the front or rear plates 11 and 12, as is evident from Figure 2. Ordinarily, however, the amount of air issuing from the unit may be controlled by the blower delivering the air to the air inlet duct 55.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In an air conditioning evaporator unit including an elongated rectangular container and tube receiving means on the top of the container, a tube on top of said container rotatably mounted in said tube receiving means with the interior of the tube communicating with the interior of the container, said tube having an elongated slot therein, means to rotate said tube in said tube receiving means for positioning said slot at a desired point, and means for locking said tube against rotation.

2. In an evaporator unit including a container having tube receiving bosses on the top thereof, a horizontal tube rotatably mounted at its ends in said bosses and extending across the top of said container, said tube having an opening in communication with the interior of said container and a discharge orifice for passage of conditioned air from the container, means for rotating said tube about its horizontal axis in said bosses to position said orifice at a desired point and means for holding said tube against rotation.

3. In an evaporator unit including a container having spaced opposed tube receiving bosses formed on the top thereof, a tube rotatably mounted on top of said container with its ends disposed in said bosses, said tube having an opening communicating with the interior of the container and a slot opening to the atmosphere, means for rotating said tube to position said slot at a desired point and a bolt for locking said tube in an adjusted position.

4. In a conditioning unit including a casing having tube receiving means formed on the top thereof an elongated tube rotatably mounted across the top of said casing in said tube receiving means, said tube being in communication with the interior of the casing and having a slot extending longitudinally thereof whereby rotation of the tube changes the position of the slot.

5. In an air conditioning unit including a casing having spaced opposed tube receiving bosses formed on the top thereof, an elongated tube rotatably mounted in said bosses on top of said casing in communication with the interior of the casing, said tube having a discharge opening therein whereby rotation of the tube permits selective variations in the position of said opening.

RALPH F. PEO.